US008788452B2

(12) United States Patent
Stoneking et al.

(10) Patent No.: US 8,788,452 B2
(45) Date of Patent: Jul. 22, 2014

(54) COMPUTER ASSISTED BENCHMARKING SYSTEM AND METHOD USING INDUCTION BASED ARTIFICIAL INTELLIGENCE

(75) Inventors: Michael D. Stoneking, Akron, OH (US); Olivier L. Curet, Cleveland, OH (US)

(73) Assignee: Deloitte Development LLC, Hermitage, TN (US)

( * ) Notice: Subject to any disclaimer, the term of this patent is extended or adjusted under 35 U.S.C. 154(b) by 1729 days.

(21) Appl. No.: 10/093,073

(22) Filed: Mar. 7, 2002

(65) Prior Publication Data
US 2003/0050814 A1 Mar. 13, 2003

Related U.S. Application Data

(60) Provisional application No. 60/274,122, filed on Mar. 8, 2001.

(51) Int. Cl.
*G06F 7/00* (2006.01)
*G06F 17/00* (2006.01)
*G06Q 10/00* (2012.01)
*G06Q 10/06* (2012.01)
*G06Q 10/10* (2012.01)

(52) U.S. Cl.
CPC .......... *G06Q 10/06* (2013.01); *G06Q 10/06393* (2013.01); *G06Q 10/10* (2013.01)
USPC .......................... 707/603; 705/7.38; 705/7.39

(58) Field of Classification Search
USPC .................... 705/7, 10–11; 707/603
See application file for complete search history.

(56) References Cited

U.S. PATENT DOCUMENTS

| 5,684,964 | A | * | 11/1997 | Powers et al. ............. 705/11 |
| 5,694,524 | A | * | 12/1997 | Evans ....................... 706/12 |
| 5,839,105 | A | * | 11/1998 | Ostendorf et al. .......... 704/256 |
| 6,067,719 | A | * | 5/2000 | Forman ..................... 33/1 SD |
| 6,092,060 | A | * | 7/2000 | Guinta et al. .............. 706/47 |
| 6,269,353 | B1 | * | 7/2001 | Sethi et al. ................. 706/20 |
| 6,327,571 | B1 | * | 12/2001 | Khayat et al. .............. 705/10 |
| 6,336,109 | B2 | * | 1/2002 | Howard ..................... 706/25 |
| 6,430,536 | B2 | * | 8/2002 | Irving et al. ............... 705/2 |
| 6,567,814 | B1 | * | 5/2003 | Bankier et al. ............. 707/101 |
| 6,636,860 | B2 | * | 10/2003 | Vishnubhotla ............. 707/600 |
| 6,757,660 | B2 | * | 6/2004 | Canada et al. ............. 705/7 |
| 6,850,892 | B1 | * | 2/2005 | Shaw ........................ 705/8 |
| 6,877,034 | B1 | * | 4/2005 | Machin et al. ............. 709/223 |

(Continued)

OTHER PUBLICATIONS

"A method for Attribute Selection in Inductive Systems" Paul W. Bairn, IEEE transactions on Pattern Analysis and Machine Intelligence, vol. 10, No. 6, Nov. 1988.*

(Continued)

*Primary Examiner* — Uyen Le
(74) *Attorney, Agent, or Firm* — Kramer Levin Naftalis & Frankel LLP

(57) ABSTRACT

A system and method are provided for the collection of business performance data and the identification of patterns or rules from such data that are key predictors of future business performance. The performance data are preferably collected using one or several questionnaires containing a plurality of questions that probe into specific performance areas of companies. The questionnaires are used to collect responses applicable to a plurality of companies and the responses applicable to each company are stored in a database as separate company profiles to define the knowledge-base from which a rule induction engine may identify the key discriminators of business performance.

16 Claims, 19 Drawing Sheets

(56) References Cited

U.S. PATENT DOCUMENTS

| | | | | |
|---|---|---|---|---|
| 2001/0053991 A1* | 12/2001 | Bonabeau | | 705/7 |
| 2002/0083067 A1* | 6/2002 | Tamayo et al. | | 707/100 |
| 2002/0184067 A1* | 12/2002 | McLean et al. | | 705/7 |
| 2002/0193950 A1* | 12/2002 | Gavin et al. | | 702/28 |
| 2003/0061141 A1* | 3/2003 | D'Alessandro | | 705/36 |
| 2010/0223211 A1* | 9/2010 | Johnson et al. | | 706/11 |

OTHER PUBLICATIONS

"Benchmarking European Software Management Practices", Soumitra Dutta, Luk N. Van Wassenhove, and Selvan Kulandaiswamy, Communications of the ACM, vol. 41, No. 6, Jun. 1998.*

Classification and Regression Trees. http://www.statsoft.com/textbook/classification-and-regression-trees/.*

Brachman et al. Mining business databases. Communications of the ACM CACM Homepage archive vol. 39 Issue 11, Nov. 1996 ACM New York, NY, USA.*

Kao and Shumaker, 1999 D. Kao and R. Shumaker, Equity style timing, Financial Analysts Journal 55 (1999), pp. 37-48.*

Turpin RS, Darcy LA, Koss R, et al. A model to assess the usefulness of performance indicators. Int J Qual Health Care 1996;8:321-9.*

* cited by examiner

| | Insufficient Knowledge | Strongly disagree | Somewhat disagree | Somewhat Agree | Agree | Strongly Agree |
|---|---|---|---|---|---|---|
| 1. Senior management understands the potential effects of e-business on the organization. | 0 | 1 | 2 | 3 | 4 | 5 |
| 2. The organization is recognized as an e-business leader in its industry. | 0 | 1 | 2 | 3 | 4 | 5 |
| 3. The organization is prepared to reengineer its business practices to incorporate e-business strategies and opportunities. | 0 | 1 | 2 | 3 | 4 | 5 |
| 4. The organization utilizes the Internet for customer service. | 0 | 1 | 2 | 3 | 4 | 5 |
| 5. The organization utilizes the Internet for procurement. | 0 | 1 | 2 | 3 | 4 | 5 |
| 6. The organization's Internet-based sell-side and supply-side systems are integrated with ERP and other enterprise systems. | 0 | 1 | 2 | 3 | 4 | 5 |
| 7. The organization has aligned its technology infrastructure with its strategic goals for e-business. | 0 | 1 | 2 | 3 | 4 | 5 |
| 8. The organization's Internet security system ensures the integrity of e-business transactions and protects the privacy of its customers who provide data over the Internet. | 0 | 1 | 2 | 3 | 4 | 5 |
| 9. The organization is aware of the tax laws and regulations in the jurisdictions in which its conducts, or is planning to conduct, e-business (i.e. to minimize e-business tax liabilities, etc.). | 0 | 1 | 2 | 3 | 4 | 5 |
| 10. The organization's employees understand its e-business strategies. | 0 | 1 | 2 | 3 | 4 | 5 |
| 11. The organization's web site is an effective place in which to conduct business. | 0 | 1 | 2 | 3 | 4 | 5 |
| 12. The organization uses an intranet to streamline internal processes and/or share knowledge. | 0 | 1 | 2 | 3 | 4 | 5 |
| 13. The organization complies with requirements (e.g., legal) that regulate conducting business on the Internet. | 0 | 1 | 2 | 3 | 4 | 5 |
| 14. The organization provides adequate funding to realize its e-business goals. | 0 | 1 | 2 | 3 | 4 | 5 |
| 15. The organization has a strategy that anticipates and reduces the potential impact of adverse events on its e-business operations. | 0 | 1 | 2 | 3 | 4 | 5 |
| 16. The organization protects its intellectual property that it makes available on the Internet. | 0 | 1 | 2 | 3 | 4 | 5 |
| 17. The organization has established controls and reporting procedures to enable senior management to assess the development of the organization's e-business projects. | 0 | 1 | 2 | 3 | 4 | 5 |
| 18. The organization uses the Internet to help manage its investor or stakeholder relationships. | 0 | 1 | 2 | 3 | 4 | 5 |
| 19. The organization utilizes the Internet to manage its relationships with past, current, and future employees. | 0 | 1 | 2 | 3 | 4 | 5 |
| 20. The organization has measurement techniques to assess the effectiveness of its Internet presence. | 0 | 1 | 2 | 3 | 4 | 5 |

FIG. 2

| | Insufficient Knowledge | Strongly disagree | Somewhat disagree | Somewhat Agree | Agree | Strongly Agree |
|---|---|---|---|---|---|---|
| 1. There is an appropriate level of sufficiency and timeliness with which key risk and control information is provided to management. | 0 | 1 | 2 | 3 | 4 | 5 |
| 2. Business controls are part of the corporate culture. | 0 | 1 | 2 | 3 | 4 | 5 |
| 3. Senior management shows commitment to the controls framework. | 0 | 1 | 2 | 3 | 4 | 5 |
| 4. There is an appropriate level of strength of change management systems.. | 0 | 1 | 2 | 3 | 4 | 5 |
| 5. There is an appropriate level of control over budget and financial performance. | 0 | 1 | 2 | 3 | 4 | 5 |
| 6. There is an appropriate level of confirmation of compliance with control criteria. | 0 | 1 | 2 | 3 | 4 | 5 |
| 7. There is an appropriate level of strength of the internal audit activity. | 0 | 1 | 2 | 3 | 4 | 5 |
| 8. Management monitors the pace of achievement against plans/budgets and if necessary updates the latter for changes in the business environment. | 0 | 1 | 2 | 3 | 4 | 5 |
| 9. Procedures exist to deal with a breakdown of controls. | 0 | 1 | 2 | 3 | 4 | 5 |
| 10. There is an appropriate level of key control processes. | 0 | 1 | 2 | 3 | 4 | 5 |
| 11. There is a process for monitoring whether business units have the capability in terms of knowledge, skills and competencies to successfully manage the risks for which they are responsible. | 0 | 1 | 2 | 3 | 4 | 5 |
| 12. There is an appropriate level of risk management systems. | 0 | 1 | 2 | 3 | 4 | 5 |
| 13. The organization has established guidelines which minimize the risks which are undertaken. | 0 | 1 | 2 | 3 | 4 | 5 |
| 14. Risk and control are linked to the organization's ability to meet the business objectives set by senior management. | 0 | 1 | 2 | 3 | 4 | 5 |
| 15. The organization has appropriate policies and working practices to reduce risks by enhancing the quality of its people. | 0 | 1 | 2 | 3 | 4 | 5 |
| 16. New and changing risks are clearly identified and reported to senior management. | 0 | 1 | 2 | 3 | 4 | 5 |
| 17. Senior management reviews performance against plans and business risk dynamics. | 0 | 1 | 2 | 3 | 4 | 5 |
| 18. There are open channels for dialogue and communications relevant to the changing business environment. | 0 | 1 | 2 | 3 | 4 | 5 |
| 19. The organization takes advantage from risk exposure 'offsets' between different activities within the group. | 0 | 1 | 2 | 3 | 4 | 5 |
| 20. Corporate due diligence processes are appropriate. | 0 | 1 | 2 | 3 | 4 | 5 |

FIG. 3

Technology E-Business - finance sector
Performance ranking

- ➤ Companies in the database are grouped into three performance quartiles
  - The top 25% ("top quartile"), middle 50% ("inter quartile"), and bottom 25% comprising the "bottom quartile"
- ➤ Overall, your answers place you in the inter quartile
- ➤ Your answers to questions 5, 14, and 16 were most influential in determining your quartile positioning
  - Question 5: The organisation takes advantage of the Internet for procurement.
  - Question 14: The organisation is adequately funded or budgeted to realise its e-business goals.
  - Question 16: The organisation takes steps to protect its rights to intellectual property it makes available on the Internet.
- ➤ In those rare cases where the organization's features follow no clear pattern, the organization is given an inter quartile positioning.

FIG. 4B

Technology E-Business - finance sector

Test for Top Quartile Positioning

Top Quartile Test:

| Rule | Your Answer | Top Quartile Criteria Met? |
|---|---|---|
| IF Question 5* > 3 | 1 | No |
| AND Question 14*† 4 | 1 | No |

Conclusion:
The organisation is not a top quartile performer

*Driving questions:

Q5. The organization takes advantage of the Internet for procurement.

Q14. The organization is adequately funded or budgeted to realise its e-business goals.

FIG. 4C

Technology E-Business - finance sector

Test for Inter Quartile Positioning

Inter Quartile Test:

| Rule | | | Your Answer | Inter Quartile Criteria Met? |
|---|---|---|---|---|
| IF Question 5* | ? | 3 | 0 | Yes |
| AND Question 16* | > | 1 | 5 | Yes |

OR

| Rule | | | Your Answer | Inter Quartile Criteria Met? |
|---|---|---|---|---|
| IF Question 5* | > | 3 | 0 | No |
| AND Question 14* | < | 4 | 5 | No |

Conclusion:
The organisation is an inter quartile performer

*Driving questions:

Q5. The organisation takes advantage of the Internet for procurement.

Q16. The organisation takes steps to protect its rights to intellectual property it makes available on the Internet.

Q14. The organisation is adequately funded or budgeted to realise its e-business goals.

FIG. 4D

Technology. E-Business - finance sector

Test for Bottom Quartile Positioning

Bottom Quartile Test:

| Rule | Your Answer | Bottom Quartile Criteria Met? |
|---|---|---|
| IF Question 5* ? 3 | 0 | Yes |
| AND Question 16* ? 1 | 5 | No |

Conclusion:
The organisation is not a bottom quartile performer

*Driving questions:

Q5. The organisation takes advantage of the Internet for procurement.

Q16. The organisation takes steps to protect its rights to intellectual property it makes available on the Internet.

FIG. 4E

| QUES. | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| 1 | 3 | 4 | 2 | 2 | 2 | 2 | 2 | 4 | 4 | 4 | 1 | 4 | 2 | 2 | 2 | 1 | 2 | 2 | 4 | 4 | 2 |
| 2 | 2 | 4 | 4 | 4 | 1 | 2 | 4 | 4 | 2 | 4 | 1 | 4 | 4 | 2 | 4 | 1 | 4 | 4 | 4 | 1 | 4 |
| 3 | 4 | 4 | 4 | 2 | 2 | 4 | 4 | 3 | 4 | 4 | 1 | 2 | 2 | 2 | 4 | 1 | 4 | 4 | 4 | 4 | 3 |
| 4 | 2 | 4 | 2 | 2 | 4 | 3 | 1 | 3 | 1 | 2 | 2 | 3 | 2 | 4 | 2 | 2 | 2 | 2 | 4 | 4 | 4 |
| 5 | 2 | 4 | 2 | 2 | 2 | 2 | 3 | 3 | 2 | 4 | 2 | 4 | 1 | 3 | 3 | 1 | 2 | 4 | 2 | 2 | 3 |
| 6 | 2 | 2 | 4 | 2 | 3 | 2 | 3 | 4 | 2 | 4 | 2 | 2 | 1 | 4 | 4 | 1 | 2 | 2 | 3 | 2 | 3 |
| 7 | 4 | 4 | 4 | 1 | 3 | 2 | 3 | 4 | 3 | 4 | 4 | 4 | 2 | 4 | 4 | 1 | 2 | 4 | 4 | 2 | 3 |
| 8 | 2 | 3 | 4 | 2 | 3 | 2 | 4 | 4 | 2 | 3 | 4 | 2 | 4 | 4 | 4 | 2 | 2 | 2 | 1 | 3 | 3 |
| 9 | 1 | 4 | 2 | 4 | 2 | 2 | 2 | 2 | 1 | 4 | 4 | 4 | 4 | 3 | 4 | 1 | 1 | 3 | 2 | 3 | 3 |
| 10 | 2 | 2 | 2 | 3 | 3 | 4 | 3 | 5 | 4 | 4 | 4 | 2 | 1 | 3 | 4 | 2 | 1 | 3 | 2 | 2 | 2 |
| 11 | 2 | 4 | 4 | 4 | 3 | 4 | 4 | 4 | 2 | 3 | 3 | 3 | 2 | 4 | 4 | 1 | 1 | 3 | 2 | 3 | 3 |
| 12 | 1 | 2 | 5 | 2 | 2 | 2 | 4 | 4 | 3 | 3 | 4 | 4 | 1 | 4 | 2 | 2 | 2 | 3 | 3 | 2 | 2 |
| 13 | 2 | 2 | 4 | 3 | 3 | 2 | 4 | 4 | 2 | 3 | 3 | 2 | 1 | 4 | 3 | 2 | 4 | 3 | 3 | 3 | 2 |
| 14 | 3 | 2 | 2 | 2 | 3 | 2 | 2 | 3 | 2 | 3 | 3 | 2 | 1 | 3 | 2 | 2 | 1 | 3 | 3 | 2 | 2 |
| 15 | 2 | 4 | 2 | 2 | 4 | 2 | 3 | 3 | 2 | 4 | 3 | 3 | 3 | 4 | 2 | 2 | 1 | 2 | 3 | 3 | 2 |
| 16 | 2 | 5 | 4 | 3 | 3 | 2 | 3 | 4 | 2 | 4 | 3 | 2 | 3 | 2 | 4 | 3 | 1 | 2 | 4 | 3 | 4 |
| 17 | 2 | 2 | 4 | 2 | 2 | 2 | 2 | 3 | 1 | 4 | 3 | 2 | 1 | 4 | 2 | 1 | 4 | 2 | 3 | 2 | 3 |
| 18 | 4 | 4 | 2 | 3 | 1 | 1 | 4 | 4 | 2 | 3 | 2 | 3 | 2 | 2 | 2 | 1 | 2 | 3 | 4 | 1 | 4 |
| 19 | 2 | 2 | 4 | 3 | 2 | 4 | 4 | 4 | 2 | 4 | 1 | 2 | 1 | 2 | 4 | 1 | 4 | 4 | 4 | 2 | 2 |
| 20 | 4 | 4 | 2 | 2 | 2 | 2 | 2 | 4 | 1 | 4 | 1 | 2 | 2 | 2 | 4 | 2 | 4 | 4 | 2 | 2 | 2 |
| Outcome | 3 | 4 | 3 | 3 | 3 | 2 | 3 | 5 | 1 | 3 | 1 | 3 | 2 | 4 | 4 | 2 | 2 | 5 | 4 | 3 | 2 |
| Sector | 3 | 3 | 4 | 3 | 1 | 2 | 4 | 4 | 3 | 3 | 2 | 5 | 4 | 5 | 3 | 2 | 6 | 5 | 3 | 2 | 1 |
| Turn over | 2 | 3 | 4 | 3 | 3 | 4 | 4 | 2 | 5 | 4 | 4 | 5 | 5 | 5 | 1 | 1 | 1 | 3 | 4 | 2 | 3 |

FIG. 8

| QUES. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| 1 | 4 | 1 | 4 | 5 | 3 | 1 | 4 | 4 | 3 | 2 | 2 | 5 | 4 | 2 | 4 | 4 | 4 | 4 | 2 | 4 | 1 | 5 | 3 | 4 | 2 |
| 2 | 4 | 2 | 3 | 5 | 3 | 3 | 3 | 3 | 3 | 3 | 2 | 5 | 4 | 2 | 1 | 2 | 3 | 2 | 4 | 4 | 1 | 4 | 3 | 2 | 2 |
| 3 | 4 | 2 | 3 | 3 | 5 | 3 | 2 | 3 | 3 | 3 | 1 | 5 | 4 | 4 | 2 | 2 | 4 | 3 | 4 | 4 | 4 | 5 | 3 | 2 | 2 |
| 4 | 4 | 4 | 1 | 5 | 2 | 1 | 2 | 3 | 3 | 2 | 2 | 4 | 4 | 2 | 2 | 2 | 4 | 4 | 4 | 4 | 4 | 5 | 3 | 2 | 2 |
| 5 | 4 | 2 | 1 | 5 | 2 | 1 | 2 | 3 | 3 | 5 | 4 | 5 | 4 | 2 | 2 | 2 | 4 | 3 | 4 | 4 | 1 | 5 | 2 | 2 | 2 |
| 6 | 4 | 2 | 1 | 5 | 2 | 1 | 2 | 3 | 3 | 4 | 2 | 5 | 4 | 2 | 2 | 2 | 2 | 3 | 4 | 4 | 1 | 4 | 2 | 2 | 2 |
| 7 | 4 | 2 | 1 | 3 | 2 | 1 | 2 | 3 | 3 | 1 | 4 | 5 | 2 | 2 | 4 | 4 | 4 | 4 | 4 | 4 | 1 | 5 | 2 | 4 | 2 |
| 8 | 5 | 2 | 2 | 5 | 4 | 1 | 2 | 5 | 3 | 1 | 4 | 5 | 2 | 2 | 2 | 2 | 2 | 2 | 4 | 4 | 1 | 5 | 1 | 2 | 4 |
| 9 | 5 | 4 | 2 | 5 | 2 | 1 | 2 | 4 | 3 | 1 | 4 | 5 | 2 | 2 | 2 | 2 | 4 | 4 | 4 | 4 | 4 | 5 | 3 | 4 | 2 |
| 10 | 5 | 4 | 2 | 5 | 2 | 1 | 4 | 3 | 2 | 1 | 5 | 5 | 2 | 2 | 4 | 4 | 4 | 4 | 4 | 4 | 4 | 4 | 1 | 4 | 2 |
| 11 | 4 | 2 | 2 | 4 | 2 | 1 | 2 | 4 | 2 | 1 | 5 | 5 | 2 | 2 | 2 | 2 | 2 | 1 | 4 | 2 | 5 | 4 | 2 | 4 |
| 12 | 4 | 2 | 2 | 4 | 2 | 1 | 2 | 4 | 2 | 1 | 4 | 4 | 2 | 2 | 2 | 2 | 2 | 1 | 2 | 2 | 4 | 5 | 1 | 2 | 2 |
| 13 | 5 | 2 | 5 | 4 | 1 | 1 | 3 | 4 | 5 | 1 | 5 | 4 | 2 | 2 | 2 | 2 | 2 | 2 | 4 | 2 | 2 | 5 | 4 | 2 | 2 |
| 14 | 4 | 2 | 2 | 5 | 1 | 1 | 2 | 4 | 5 | 1 | 5 | 4 | 2 | 2 | 2 | 2 | 2 | 2 | 2 | 1 | 4 | 4 | 2 | 2 | 4 |
| 15 | 3 | 4 | 5 | 5 | 3 | 3 | 2 | 3 | 4 | 1 | 4 | 4 | 4 | 2 | 4 | 4 | 4 | 4 | 4 | 1 | 2 | 4 | 1 | 4 | 2 |
| 16 | 4 | 4 | 3 | 3 | 3 | 1 | 2 | 3 | 2 | 1 | 5 | 4 | 2 | 2 | 4 | 4 | 4 | 4 | 4 | 2 | 5 | 2 | 4 | 2 |
| 17 | 4 | 2 | 2 | 4 | 4 | 1 | 2 | 3 | 4 | 1 | 4 | 4 | 4 | 2 | 4 | 4 | 4 | 4 | 4 | 1 | 2 | 4 | 2 | 4 | 2 |
| 18 | 4 | 2 | 2 | 5 | 2 | 1 | 2 | 4 | 5 | 1 | 5 | 4 | 2 | 2 | 2 | 2 | 4 | 2 | 4 | 1 | 1 | 4 | 2 | 2 | 2 |
| 19 | 3 | 5 | 2 | 5 | 2 | 1 | 2 | 4 | 4 | 2 | 4 | 4 | 2 | 2 | 2 | 2 | 2 | 1 | 4 | 4 | 4 | 5 | 2 | 2 | 2 |
| 20 | 4 | 5 | 4 | 5 | 2 | 3 | 4 | 4 | 4 | 1 | 4 | 4 | 2 | 4 | 2 | 2 | 4 | 2 | 4 | 4 | 1 | 5 | 2 | 2 | 1 |
| Outcome | 1 | 0 | 1 | 0 | 1 | 1 | 1 | 0 | 0 | 1 | 0 | 0 | 1 | 1 | 0 | 0 | 0 | 0 | 0 | 0 | 1 | 0 | 1 | 0 | 1 |

FIG. 10

| BEST PRACTICES |
|---|
| Question 1 |
| 1. (ensure there is a written, strategic business plan related to e-business that articulates a clear vision of the impact that e-business will have on their business and industry - and ensure the plan has been communicated; |
| 2. build a vision on how to exploit all of the organization's opportunities to serve customers over the Internet; |
| 3. assess to what extent it is possible to change customer habits and gain their support for e-business.) |
| Question 2 |
| 1. (ensure the organization is taking a leadership role in industry-wide initiatives from which it will benefit; |
| 2. use competitive intelligence and third party organizations on a regular basis to assess precisely the organization's reputation in e-business; |
| 3. customers, for example by becoming a "service magnet" or an "industry magnet", bringing together in one site many suppliers of a product or service; |
| Question 3 |
| 1. develop senior management understanding of e-business, solicit support and endorsement, and obtain time and resource to perform re-engineering; |
| 2. set up controls to ensure that the potential implications of re-engineering are taken into account in implementing the e-business plan; |
| 3. ensure there is a top management commitment to re-engineering projects especially when they involve new e-business technologies.) |
| Question 4 |
| 1. establish customer-related business objectives for the web site, in terms of enhanced brand awareness in target audience, quality and interest of site content to target audience, ease and security of customer online ordering and payment, speed and convenience of provision of customer support and automated services; |
| 2. ensure there is senior management support on new initiatives to use the Internet to serve customers - and keep asking customers what they think about the organization's use of the Internet and the services provided and anticipate the need for improvement and further innovation; |
| 3. ensure system designers ought to demonstrate a lot of creativity in arranging web-based customer service.) |
| Question 5 |
| 1. (exploit substantially all of the organization's opportunities to procure goods and services over the Internet; |
| 2. technology changes, economic conditions, etc.; |
| 3. ensure IT management knows that wherever possible, proven technologies should be used first and that using too much technology innovation at the customer interface should be avoided.) |
| Question 6 |
| 1. improve the organization's ability to revise demand forecasts on the basis of information collected and share this information with main suppliers to enhance production planning and to reduce stock levels throughout the supply chain in order to enhance integrated planning in the supply chain and stock reductions; |
| 2. ensure management is able to distinguish the characteristics and e-business potential of business-to-consumer transactions and those of business-to-business transactions; |
| 3. recognize that increasing choice of available integrated systems does not necessarily mean a better choice.) |
| Question 7 |
| 1. identify resource gaps, including of relevant staff and technology expertise, capabilities and experience, against e-business goals and needs; |
| 2. work out the implications for business operations of continuous delivery through e-business, and the effects on products and services when customers are on real time, purchasing around the clock; |
| 3. utilize more the increasing "intelligence" built into advanced e-business tools.) |
| Question 8 |
| 1. (recognize that when customers choose to do business through an Internet channel they make an investment of time and attention, and they may offer sensitive information such as credit card information; |
| 2. set up a comprehensive and highly effective security and controls architecture; |
| 3. ensure the Internet security system is updated on a regular basis - including anti virus software, firewalls protection, etc.) |
| Question 9 |
| 1. (ensure that the organization complies with the tax laws and regulations of the jurisdictions in which it does or is deemed to do business via the Internet; |
| 2. ensure the organization takes steps through careful planning to minimize its tax liability when it comes to e-business transactions; |
| 3. make sure accountants with international tax experience are involved in the review of the organization's e-business strategies.) |
| Question 10 |
| 1. ensure employees are enthusiastic and energized by the opportunities of business in cyberspace; |
| 2. train company staff on the right information to use in responding to queries by customers during e-business processes; |
| 3. maintain the currency of rapidly changing e-business data, information and knowledge available to staff.) |

FIG. 14A

| BEST PRACTICES |
|---|
| Question 11 |
| 1. implement e-business in a way that is compatible with the existing systems and enables it to operate through all electronic platforms within the organization; |
| 2. ensure the organization is always looking for how best to extract value whether in securing information or in marketing, selling and buying products and services through its web site in preference to traditional ones; |
| 3. examine carefully the technologies available for transactions and payments, data collection, and graphics and animation.) |
| Question 12 |
| 1. ensure the organization uses an intranet-like approach to share critical knowledge in order to develop new products and services for new customers; |
| 2. assess and develop potential solutions and employee incentive programs for sharing knowledge; |
| 3. incorporate and codify the use of e-business knowledge in marketing and selling processes; |
| Question 13 |
| 1. review the key organizational processes for corporate integration and control of governance and compliance matters related to the Internet; |
| 2. verify compliance with all legal and regulatory standards endorsed by the organization; |
| 3. identify accountabilities for Internet-related compliance and Internet-related risk management.) |
| Question 14 |
| 1. (ensure senior management has a realistic view of the significant effort and funding that e-business requires and that it is making the necessary investment; |
| 2. ensure there is an appropriate level of control of e-business goals through planning and budget setting and also regular appraisal processes; |
| 3. determine the extent to which the costs of e-business are allocated to products and services, and establish the accounting treatment for e-business transactions.) |
| Question 15 |
| 1. encode methodologies and processes to be followed in the event of a disaster, covering the key threat scenarios, and including detailed responsibilities, procedures and guidelines; |
| 2. monitor competitors' contingency plans to enhance the company's own plans; |
| 3. enhance company contingency plans and speed of response to changing circumstances and ensure the plans in place for e-business are reviewed on a regular basis.) |
| Question 16 |
| 1. treat e-business as a potential source of competitive intelligence, but differentiate between competitors' information and disinformation; |
| 2. use e-business for updating and re-directing existing knowledge; |
| 3. recognize the increased potential of electronic publishing and research services.) |
| Question 17 |
| 1. for each unit, brainstorm what are the key e-business project risks which the organization faces and what early warning reporting mechanisms would result in the event of large unwelcome surprises; |
| 2. ensure management is aware that outsourcing of e-business development projects may become a necessity, for example to obtain access to knowledge of standards and security, to reduce risks, etc.; |
| 3. ensure that the new e-business processes and practices are monitored and aligned where possible with the organization structure and its people.) |
| Question 18 |
| 1. make the organization's financial information available on the Internet and ensure specific reports are sent by email to targeted stakeholders; |
| 2. ensure the use of the Internet for PR purposes does not compromise the high professionalism of external communications; |
| 3. ensure there is a high level of commitment to satisfying stakeholders by being innovative and responsive to their expectations.) |
| Question 19 |
| 1. ensure the organization uses the Internet to its advantage in creating a virtual community for its past, present and future workforce; |
| 2. ask management on a regular basis in what other ways do they see scope to improve staff productivity, training and motivation by a better use of the Internet; |
| 3. ensure there are regular assessments of the company's use of the Internet as an employer, in training and developing its staff, and in handling people issues.) |
| Question 20 |
| 1. be aware of the need to quantify intangible matters such as the possibility of information overload for potential customers; |
| 2. improve the investment/operating criteria and performance indicators of e-business strategy success or failure; |
| 3. set clear quantitative and qualitative measures of the success of the organization's Internet presence.) |

FIG. 14B

COMPUTER ASSISTED BENCHMARKING SYSTEM AND METHOD USING INDUCTION BASED ARTIFICIAL INTELLIGENCE

RELATED APPLICATION DATA

This Application claims priority from previously filed U.S. Provisional Patent Application No. 60/274,122 filed on Mar. 8, 2001, the disclosure of which is incorporated by reference in its entirety.

RESERVATION OF COPYRIGHT

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention is generally directed to a system and method for evaluating particular performance aspects of a business. More particularly, the present invention is directed to the use of benchmarking questionnaires and rule-induction based logical processes to rank and position business performance in specific areas by identifying relevant criteria or key discriminators that drive toward specific levels of performance.

Benchmarking is a well-known technique employed by consultants, advisors and like business analysts for assisting in the improvement of corporate performance by comparing the performance of an entity within the same organization or against other organizations. Benchmarking is typically associated with comparisons of overhead and operating costs as part of an organization's efforts to improve its competitive cost base in order to enhance its overall performance.

The concept underlying benchmarking is that current organizational performance in defined activities can be compared internally and/or externally. For example, external benchmarking can be achieved by: (i) direct information exchange under special arrangements with chosen individual benchmarking professionals having a particular knowledge concerning the practices of peers in a relevant area or industry, or (ii) participation in or subscription to an independent database of the comparable performance of a number of organizations (with their identities hidden). These databases enable comparison with a so-called "best in class" among the participating organizations.

While these known uses of benchmarking may be helpful in identifying operational processes and financial measures indicative of overall corporate performance and health, these known applications of benchmarking do not capture all the main, relevant dimensions of a company's performance. That is, these traditional benchmarking techniques identify a business's outputs as compared to the outputs of other businesses which are not necessarily indicators of future business drivers. Thus, past period sales revenue, for example, may provide no indication of future customer satisfaction that may arise, for example, from the length of re-order cycles and/or new product development.

While these quantitative approaches to benchmarking may in the long run help improve overall performance, such approaches are difficult to prepare and interpret and require undue reliance on third parties. The problems with benchmarking are especially acute in benchmarking business performance. Despite all the expertise available in the area of business performance, that expertise is recorded mainly in the form of experiences or cases. The knowledge from the facts and outcomes that comprise these cases is not easily converted into a set of rules that can be used to predict future business performance outcomes.

Because of the existence of numerous competing objectives, the challenge is to develop a coherent set of rules that is predictive of future success or behavior. Artificial Intelligence ("AI") has been used outside the business performance area to help extract predictive rules from a set of data. There are many approaches that fall under the rubric of AI: neural networks, rule-based systems, genetic algorithms, symbolic learning, etc. Rule-based systems have been perceived to be easily applicable to decision making in structured business domains. However, the design, applicability and use of these rule-based systems is not well suited to interpreting business performance data due to a lack of a general and well-accepted methodologies in rule-based systems design, and a high dependence on somewhat rudimentary models (such as the rule-based formalism).

Other more recent tools such as neural networks and genetic algorithms use very different approaches since they need to be trained with data sets from which they derive patterns. These new generation tools deal much more easily with unstructured decision making since their rationale is to guide the end users by enhancing their judgment rather than supplanting it.

Accordingly, a need exists for a benchmarking system and method that automatically focuses on a wide range of qualitative or non-financial measures of performance rather than exclusively on precise quantitative outputs (e.g., operating costs and overhead). A further need exists for a benchmarking system and method that is suitable for automatically defining or identifying predictive rules or patterns in a set of business performance data. A further need exists for such a benchmarking system and method that incorporate machine learning in the form of artificial intelligence using an appropriate logic based system to extract and interpret rules or patterns for a database of performance data for a plurality of companies. Such a benchmarking system and method must be capable of presenting the benchmarking results in an easy to understand format to provide a clear and strong guide to the action to be taken and agreed upon by a company's managers and leaders.

SUMMARY OF THE INVENTION

Generally speaking, the present invention provides a system and method for the collection of business performance data and the identification of patterns or rules from such data that are key predictors of future business performance.

In one aspect of the present invention, a method is provided of benchmarking to rank and position the performance of an entity in specific areas by identifying key discriminators that drive toward specific levels of performance including the steps of obtaining business performance information for a plurality of entities, the business performance information including a first set of performance criteria, each performance criterion of the first set of performance criteria having an associated value for scoring the performance of the plurality of entities, and applying rule induction techniques to evaluate the first set of performance criteria and associated values to identify an optimal subset of performance criteria that are the key discriminators.

Similarly, a benchmarking system is provided to rank and position the performance of an entity in specific areas by identifying key discriminators that drive toward specific levels of performance including a means for obtaining business performance information for a plurality of entities. The business performance information includes a first set of performance criteria, each performance criterion having an associated value for scoring the performance of the plurality of entities. The business performance information is stored in a storage means. A rule induction means is used to evaluate the first set of performance criteria and associated values to identify an optimal subset of performance criteria that are the key discriminators.

As described hereinafter, preferably the first set of business criteria and the associated values are obtained via a questionnaire containing a plurality of questions that probe into specific performance areas of the entities.

In another aspect of the present invention, the responses to the questions are preferably based on a numerical scale between 1 and 5. Based on the responses, the companies are ranked in quartiles (e.g., upper, intermediate, lower) of performance.

In another aspect of the present invention, a case based reasoning CART algorithm is used to identify the key discriminators from the business entities' data. Data that is not a key discriminator or is not strongly predictive of future performance is similarly identified or highlighted by the algorithm. In this manner, the non-predictive data may be removed from the knowledge base during regular maintenance and, if necessary, updated with new more predictive data. Thus, the knowledge base is self-improving.

Accordingly, it is an object of the present invention to provide a computer implemented benchmarking system and method to identify those business activities and indicators that influence future, as well as current performance.

Another object of the present invention is to provide an improved benchmarking system and method where factors and data that may be predictive of future profile performance of a business (such as e-business readiness) are considered along with historical factors and data that epitomize successful past performance.

A further object of the present invention to provide a benchmarking tool that utilizes artificial intelligence to derive rules and identify clusters or patterns from business performance data and link these to best practices from around the world.

A still further object of the present invention is to provide a benchmarking system and method which uses rule based induction logic to derive enhanced results and analysis.

Still other objects and advantages of the invention will in part be obvious and will in part be apparent from the specification.

The invention accordingly comprises the several steps and the relation of one or more of such steps with respect to each of the others, and the system embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is made to the following description, taken in connection with the accompanying drawings, in which:

FIG. 2 is a sample questionnaire for use in the E-business performance area according to an exemplary embodiment of the present invention;

FIG. 3 is a sample questionnaire for use in the Fraud area according to an exemplary embodiment of the present invention;

FIGS. 4A through 4E are sample reports generated with the benchmarking system and method according to an exemplary embodiment of the present invention;

FIG. 8 is a table of an example showing the responses of twenty-one companies to a questionnaire of the type shown in FIG. 2;

FIG. 10 is a table of an example showing the responses of twenty-five companies to questions of the type shown in FIG. 3;

FIGS. 14A and 14B are tables including representative best practices for each of the 20 questions in the E-business questionnaire of FIG. 2.

DETAILED DESCRIPTION OF THE PREFERRED EMBODIMENTS

Figure 1:
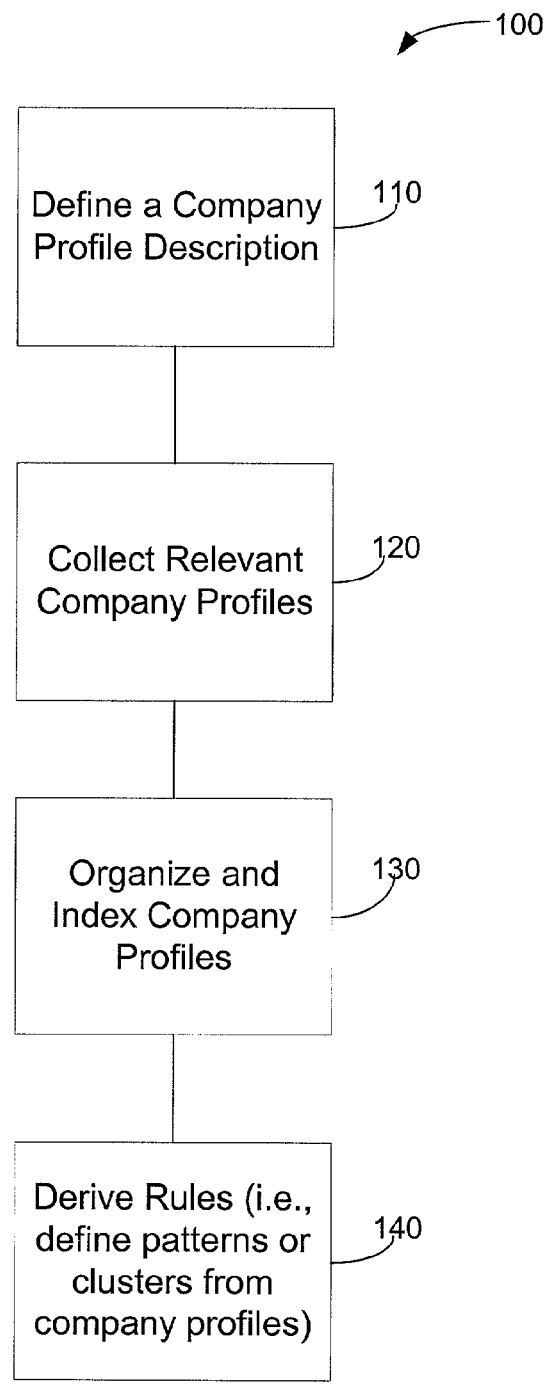
FIG. 1 is a flowchart depicting the initial steps carried out in a benchmarking system and method constructed and arranged according to an exemplary embodiment of the present invention.
Figure 4A:
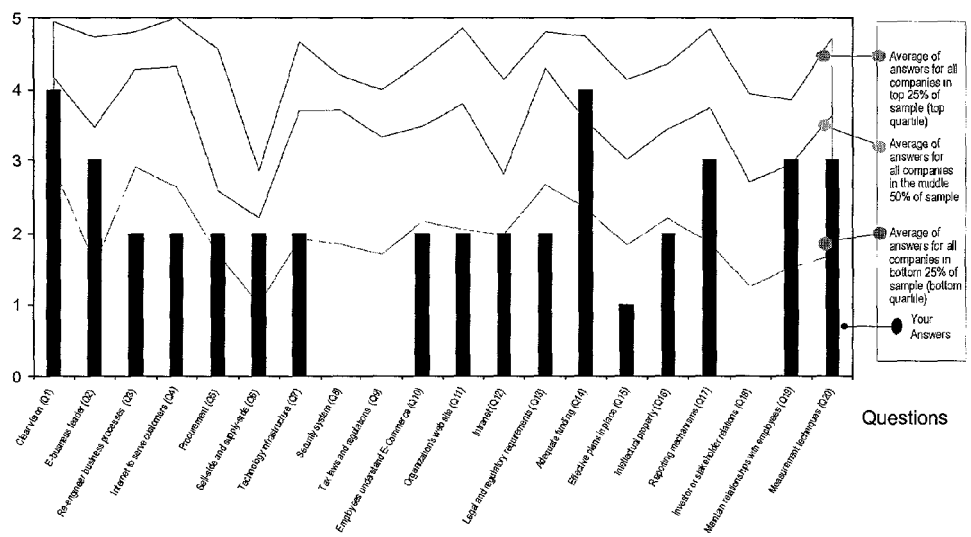

The present invention provides a system and method for the collection of business performance data and the identification of patterns or rules from such data that are key predictors of future business performance. The performance data are preferably collected using one or several questionnaires containing a plurality of questions that probe into specific performance areas of companies. The questionnaires are used to collect responses applicable to a plurality of companies and the responses applicable to each company are stored in a database as separate company profiles to define the knowledge-base from which a rule induction engine may identify the key discriminators of business performance.

According to an exemplary embodiment of the present invention thirty-three diagnostics are measured under six (6) major performance areas: (i) Organization, (ii) Shareholder value, (iii) Customers, (iv) Products and Services, (v) Technology, and (vi) Employees and Others. The various diagnostics provided for each performance area and a brief description of each diagnostic, thirty-three (33) in total, is provided below.

TECHNOLOGY (1) E-Business

Measures a company's ability to identify and exploit e-business opportunities by demonstrating a commitment to e-business in areas such as strategy, customer service, operating efficiency and knowledge management. A company's performance relative to its peers depends heavily on its ability to plan and implement an effective e-business strategy.

(2) Technology Planning

Measures a company's ability to plan technology projects. Projects with a significant technology component are usually quite complex, and effective planning helps a company ensure that project objectives, timelines and budgets are met with an acceptable degree of risk.

(3) Information Systems Management

Measures a company's ability to manage its information systems effectively. Information systems have become key drivers of company performance, significantly affecting its ability to understand and serve the interests of stakeholders, operate efficiently, capture and share knowledge, and make timely and well informed business decisions.

(4) Information Assurance

Measures the way in which a company looks at its information risks, protection assets, and computer resources in general. Successful companies manage and control their information resources well, including data sources, systems, and business processes.

Organization (5) Environmental Assessment

Measures a company's ability to identify and manage environmental risks that affect the social and ecological sustainability of its business practices. A company's ability to identify and manage environmental risks may have significant long term implications on its competitive advantage and shareholder value.

(6) Finance/Treasury/Tax

Measures a company's ability to manage the finance function, including matters associated with accounting, treasury and taxation. As financial management techniques grow more sophisticated, companies that keep up with world class practices will be in the best positions to leverage the new techniques and improve financial performance.

(7) Fraud

Measures the presence of fraud risk factors within a company. Since fraud may adversely affect a company's financial performance, credibility with investors and regulators, and market value, management must take steps to identify and mitigate the risk of fraud.

(8) Risk Management & Controls

Measures a company's ability to manage business risk by establishing and maintaining an appropriate level of internal control. An effective system of internal control manages a wide range of business risks, and failure to manage key risks effectively may jeopardize a company's ability to meet its performance objectives.

(9) Business Strategy Alignment

Measures a company's ability to align the components of its business with its chosen strategy. The degree to which a company's people, processes, structures, measures and rewards, and culture are aligned with its strategy significantly affects that company's ability to achieve its business objectives.

(10) Performance Measurement

Measures a company's ability to maintain a performance measurement system that is appropriate for the organization. An effective performance measurement system incents behavior that supports the organization's strategic and other objectives.

(11) Growth Strategy

Measures a company's ability to achieve value-creating growth by implementing a growth strategy that is appropriate for the organization. A formal growth strategy enhances a company's ability to identify and exploit the right growth opportunities, thereby enhancing shareholder value.

Customers

(12) Customer Strategy

Measures a company's ability to understand key market segments and manage relationships with existing customers. A forward-looking, customer-centric focus enhances a company's ability to establish and maintain profitable customer relationships.

(13) Marketing Plan

Measures a company's ability to create an effective marketing plan. A well designed marketing plan will enable the company to focus on the most promising market segments and implement the plan with a high degree of confidence and success.

(14) Customer Service

Measures a company's ability to provide outstanding customer service. An organization wide commitment to customer service tends to promote customer loyalty and improve financial performance.

(15) Target Price/Value

Measures a company's ability to price products effectively. Companies that stay in tune with the pricing environment and make well informed pricing decisions realize significant advantages over competitors with respect to market share and financial performance.

(16) Competitive Intelligence

Measures a company's ability to collect intelligence with regard to its competitors and apply that intelligence to make smarter business decisions. The strategy of a company is most effective if it is designed and implemented with an appreciation of the strategic plans, strengths and weaknesses, and competitive tendencies of its competitors.

(17) Anticipatory Management

Measures a company's ability to anticipate opportunities and risks. The most successful companies tend to exploit opportunities and mitigate key risks as they begin to emerge, rather than reacting to them once they have developed.

SHAREHOLDER VALUE

(18) Governance & Compliance

Measures a company's ability to safeguard stakeholder interests through a well-defined governance and compliance program. Trends such as globalization and higher standards for corporate accountability challenge companies to strengthen their governance and compliance programs.

(19) Financial Information Online

Measures a company's ability to report financial information effectively in an online environment (e.g., the Internet). Reporting financial information over the Internet allows companies to provide the investment community with superior information in a cost-effective manner, but also leads to new reporting risks that must be mitigated.

(20) Value Creation Strategy

Measures the policies and procedures employed by the company to create and enhance shareholder value. Critical to the success of the company is the ability to increase long-term shareholder value through management of strategic shareholder policies.

(21) Strategic Planning

Measures the integration of all facets of the organization with the overall strategic plan of the entity. A company must establish goals, policies, procedures, financial plans, and sustainable growth rates that are consistent with the overall strategic plan in order to succeed in accomplishing that common mission.

Products and Services

(22) Product/Service Strategy

Measures the way in which a company performs product and market analysis and delivers its product to the marketplace. Organizations studying market needs, product trends, and customer feedback seize opportunities to grow new services and penetrate new product lines.

(23) Planning & Budgeting

Measures the degree of importance placed on establishing realistic budgets, communicating company plans, and setting targets and goals to meet company objectives. Cohesive organizations maintain realistic yet challenging goals that are consistent with the mission of the company.

(24) Third Party Strategy

Measures the method in which companies develop, monitor, retain and sever relationships with parties external to the organization. Maintaining a quality reputation is easier through avoiding embarrassing relationships, establishing quality associates, and reviewing all ongoing business transactions.

(25) Quality Control

Measures the degree of emphasis placed on the importance of quality standards, quality control, and quality assurance review of the company's products or services. Companies with established quality standards and quality reviews anticipate customer needs and demands and attain excellence through achieving continued research and development of measurable standards.

(26) Outsourcing

Measures a company's ability to identify and exploit opportunities to enhance performance by outsourcing business activities. A company may improve quality and decrease costs by purchasing goods and services from external providers that have superior competencies in particular areas of the business.

(27) Innovation/R&D

Measures the extent to which the company seeks innovative opportunities and is willing to utilize research and development to create superior products and services. Companies that seek opportunities and challenges remain ahead of the competition by cornering niche markets through research and development dollars as well as inventive product ideas.

Employees and Others

(28) Knowledge Sharing

Measures the extent to which Companies share organizational information with employees as well as utilize knowledge management to meet the company's objectives. Companies that openly share knowledge share the vision of common goals and work together to solve common problems.

(29) Employee Benefits

Measures the value associated with the Company's employee benefits as well as the relative importance placed on such benefits by Company management. The quality of employee benefits and employee perception of value associated with such benefits enhances the company's ability to maintain appropriate human capital.

(30) Training

Measures the extent, relevance and appropriateness of training and development provided to enhance the competencies and goals of the company and its personnel. A proficient workforce enhances customer service, increases product quality, boosts morale and assists in reaching the company's strategic goals.

(31) HR Policies

Measures a company's ability to utilize cost-effective human resource policies to attract and retain the right employees as a means to achieving its strategic objectives. Labor market trends, such as unprecedented career mobility, rapid change in desired workforce competencies, and high demand for managerial and technical talent, have created a need for companies to challenge and strengthen their HR policies regularly.

(32) Organizational Empowerment

Measures the extent to which the organization creates a strong culture of employee empowerment through open communication, ongoing training, corporate feedback and innovative thinking. Creating a sense of worth, a feeling of belonging, an environment receptive to new ideas, and a dedication to employee morale, companies that empower their employees will reduce turnover and create employee loyalty.

(33) HR Strategy

Measures the integration of the company's human resources strategy with the strategic vision of the company to ensure appropriate objectives of Human Resources initiatives. Today's competitive marketplace requires the Human Resources Strategies to promote a corporate culture that enhances the company's goals, mission and vision.

Referring now to the drawings, FIG. 1 shows a four-step benchmarking method according to an exemplary embodiment of the present invention, shown generally as 100. In step 110, a company profile description is defined. A company profile is only a snapshot at a point in time. The objective is to encapsulate a problem definition and overall evaluation. There are many company profiles that can be used to represent a solution space for a specific problem domain. This is why it is important to assess and control the types of information that should be contained in the company profile descriptors. The information includes the data types, which in the present invention are mainly numeric (i.e., the numerical answers to the questions presented in the questionnaire).

Next, in step 120 the relevant company profiles are collected. This step recognizes that eliciting company profiles is not problem-free because of the collection of cases that contain noisy information or even invalid cases. The collection of company profiles also raises the question of the number of business cases to be gathered to provide a valid library. On the one hand, there may be too few company profiles to collect, and in this instance some domain knowledge may be missing. On the other hand, there may be too many company profiles, and in this instance the most relevant ones may become 'diluted.' However, for a solid examination of any significance on the application of induction to business performance, many company profiles are required so that statistical tests and cluster verification can be performed.

Thereafter, in step 130, the company profiles or cases are organized and indexed. This step concerns the selection of profiles to be stored, and the types of indexes to be used. This will influence mainly the retrieval process. However the appropriate profiles are retrieved, the approach cannot take shortcuts to solve the problem using case based reasoning "CBR" as might be the case under conventional rule-based Artificial Intelligence. Accordingly, the generation of similar profiles and the selection of the closest one to the present problem that supports the user's decision-making processes and, the organizing and indexing of the case-library is fundamental to the benchmarking process.

In the organizing and indexing step, an application is created for each questionnaire. For each application, company profiles are stored in sequential order and each are given a unique identifier. Each company profile may include information such as where a company comes from, the year, industry sector, and volumes of sales. Different views are created to cover different combinations of industry sectors and volumes of sales, because this is what is most significant. Different clusters are calculated by continent or by industry sector for example, using the different views.

In step 140, rules are derived from the company profile data using an induction engine. Once profiles have been stored in the benchmarking system, performing induction for example on these business cases may result in rules in a form of decision tree. All questions are used as "matching fields" (i.e. fields where values are calculated for cluster values). The integer value of the average of all the questions is used as the "target field" (i.e. field used by induction as value to cluster on). There may be instances for which the resulting decision trees will not evolve much with time. This will be the situation where new cases closely match profiles already in the case library. Once the rules are extracted, best practices can be identified (the ones used for top, inter and bottom quartile positioning profiles).

In an exemplary or preferred embodiment of the present invention, a series of benchmarking diagnostic questionnaires is prepared for each performance area that measures a company's growth and performance strategies, for example, by focusing on the diagnostics for each area to identify key success drivers or discriminators using artificial intelligence techniques (e.g., rule induction algorithms). Each questionnaire preferably inspects a specific business area (i.e., one of the 33 diagnostics) that impacts a company's ability to achieve and sustain competitive advantage in the selected business area.

For the purpose of the present invention, a description of the techniques employed as part of an exemplary embodiment of the present invention will focus on the E-business performance area and questionnaire (as shown in FIG. 2) as an illustration.

1. Data Source

The data consists of completed questionnaires as defined in step 110. For example, the E-business questionnaire is designed to measure the way a company identifies and exploits E-business opportunities in key areas of its business, including strategy, customer service, operating efficiency and knowledge sharing, relative to other companies. Preferably, each of the questions contained in the questionnaire measures a company's performance with respect to a key success driver in the area of E-business. The questions are based on extensive research into e-business practices and the collective experience of the leading e-business experts. The questions may change over time to reflect changes in key success drivers. The questionnaire is a first step in helping a company identify opportunities to improve its E-business performance.

Once the questionnaires have been designed, validated and reviewed, the next stage is to collect enough data to develop diagnostic background information, including benchmarks and best practices. Preferably, the E-business questionnaire is designed and validated by experts in a particular industry or service. In the exemplary embodiment a minimum of 100 company profiles per diagnostic are collected to enable development of appropriate data and background information.

The questionnaires are very easy to understand and answer. Accordingly, the Likert scale (1 to 5) is used since it is easy to understand and very robust from a statistical standpoint. FIGS. 2 and 3 are representative questionnaires directed to the E-business and Fraud diagnostics or metrics, respectively, each questionnaire including twenty questions. Although more than twenty questions may be used, participants tend to relate very easily to a 100 points scale: 20 questions×5 points=100 points maximum. It is also more practical to calculate specific values on 100-points scales.

Generally, data is generated from the responses to questionnaires that are circulated (electronically or by conventional delivery means) to various companies or completed by a consultant on behalf of a company as part of an in person or telephonic interview with the company. Alternatively, the questionnaires are answered by a consultant based on his or her understanding of the practices of past or current company clients.

In an exemplary embodiment, a designated representative (e.g., officer) of a participating company (hereinafter "participant") completes the representative questionnaires shown in FIGS. 2 and 3. For each question, the participant selects a number between 1 and 5, with the number 1 indicating that the person strongly disagrees and number 5 indicating that the person strongly agrees with the statement. The participant selects the number 0 if he or she does not have enough knowledge or information to rank his or her organization on a particular statement. The questionnaire is broken up into themes.

In addition to these 20 questions, the participant may be asked to identify the sector that best describes the company's industry. The participant may be presented with a chart that allows the user to select from one of the following industry sectors: Manufacturing; Consumer Business (e.g., retail, wholesale/distribution); Banking; Investment Management Services; Insurance; Real Estate; High Technology; Telecommunications; Health Care; Resources (e.g., oil & gas, natural resources, water, mining, minerals); Utilities (e.g., hydroelectric, water utilities); Government; Social Services (e.g., public housing, public health); Education; Consulting Services (e.g., law, engineering, accounting); Transportation; Trade; Media and Entertainment; Not-for-Profit; Other.

The participant may also be asked to provide additional information about the company. The participant may be asked to provide the company's Turnover/Volume of Sales (in U.S. dollars) and whether the company has grown or plans to grow revenue by more that 20% for three or more consecutive years. In addition, the participant may be given the option to include additional information that the participant believes is valuable to the survey. Additional questions regarding a company's performance may be presented to the participant such as demographic questions (i.e. level of turnover, industry sector, country, year, etc.).

2. Data Collection

In step 120, the answers provided to the questions by each participant are stored in a database as a separate company profile using a company identifier or code. Once enough company profiles have been gathered (e.g., 100 company profiles), the data are input in a spreadsheet (e.g., Microsoft Excel™) that permits the calculation of flat averages per questions (on a scale from 1 to 5) and per company profile. The flat averages are used in the presentation of the results to the participants, as shown in FIG. 3A. These results are preferably formatted as templates using, for example, Microsoft PowerPoint™ presentation software.

The same spreadsheet is also used to calculate quartile values used in the presentation of results as shown in FIGS. 4B-4E. Table 1, below, shows a sample calculation of quartiles and mean score per quartile. In an exemplary embodiment, the answers or counts to a particular question are broken up into lower, upper and intermediate quartiles. The upper-quartile and bottom-quartile each represents 25% of the answers having the highest and lowest scores, respectively, and the inter-quartile represents the middle or remaining 50% of the answers.

In the example of Table 1 below, 219 responses or counts have been received and recorded for a first question. As shown below, Table 1 includes columns for score (on a scale between 1 and 5), count (number of responses), percentage of counts, and the percentage of counts that fall within the bottom, inter or upper quartiles. For example, Table 1 illustrates that although approximately 27.4% of the counts (or 60 counts) received a score of 5, only 25% of the counts (or 54.75 counts) will be ranked in the upper-quartile. As also shown in Table 1, the remaining 2.4% of the counts (or 4.68 counts) receiving a score of 5 is ranked in the inter-quartile. These values are then used to calculate the mean value per quartile which in the case of the upper-quartile is clearly equal to 5.0. The inter-quartile means is calculated as follows: $(5 \times 4.68 + 4 \times 59 + 3 \times 35 + 10.2 \times 2))/108.8 = 3.54$. Similarly, the mean for the bottom-quartile is calculated as follows: $(0 \times 11 + 1 \times 13 + 2 \times 30.75)/54.75 = 1.36$.

TABLE 1.0

| Score | Count | Percentage | Quartiles Bottom | Inter | Upper |
|---|---|---|---|---|---|
| 5 | 60 | 27.39726 | 0.00 | 2.40 | 25.00 |
| 4 | 59 | 26.94064 | 0.00 | 26.94 | 0.00 |
| 3 | 35 | 15.98174 | 0.00 | 15.98 | 0.00 |
| 2 | 41 | 18.72146 | 14.04 | 4.68 | 0.00 |
| 1 | 13 | 5.936073 | 5.94 | 0.00 | 0.00 |
| 0 | 11 | 5.022831 | 5.02 | 0.00 | 0.00 |
| Total | 219 |  | 25 | 50 | 25 |
|  |  | Means | 1.36 | 3.54 | 5.00 |

Another spreadsheet is used to link with the presentation templates shown in FIGS. 4A-4E. The data is fed into the Microsoft Powerpoint file by updating the Microsoft Excel objects to rule induction engine that includes an induction algorithm.

It should be noted that there is a need to maintain the data contained in the database at several levels. When a new company profile is processed, it needs to be input in the knowledge base(s). This means it needs to be stored in the spreadsheets (or database) for recalculation of new quartile values. As the quartile values are also industry and geographic-specific, they need to be recalculated for all dimensions. Once the quartiles have been calculated, there is a need to recalculate the new quartile positioning values for top, inter, and bottom quartiles. There may be times when a new question will come up (as the fields change very rapidly) that require the creation of a new benchmark. Also there will be times when new questionnaires will be needed.

All maintenance is preferably repeated for all modules that are run, for all countries and for all industry sectors, provided there are enough solid data sets. Although it is possible to perform this maintenance every time a new company profile comes up, it is impractical. Accordingly, maintenance is performed at regular intervals most of the time.

3. Data Processing or Manipulation

Generally, the way induction works is that it looks at all the data sets and identifies which question(s) and associated value(s) drive towards specific levels of outcomes (e.g., quartile positioning) by defining patterns or clusters from the data sets (e.g., company profiles), as shown in step 140 of FIG. 1. More particularly, in step 140, the data are input in the inductive engine, the data (e.g., company profiles) are stored and the inductive algorithm is initiated to detect which of the 20 questions, for example, (and the "threshold values") drive toward specific outcomes (e.g., top, inter, and bottom quartile). In an exemplary embodiment, there is no automatic feed between the data source and the inductive engine.

Figure 5:
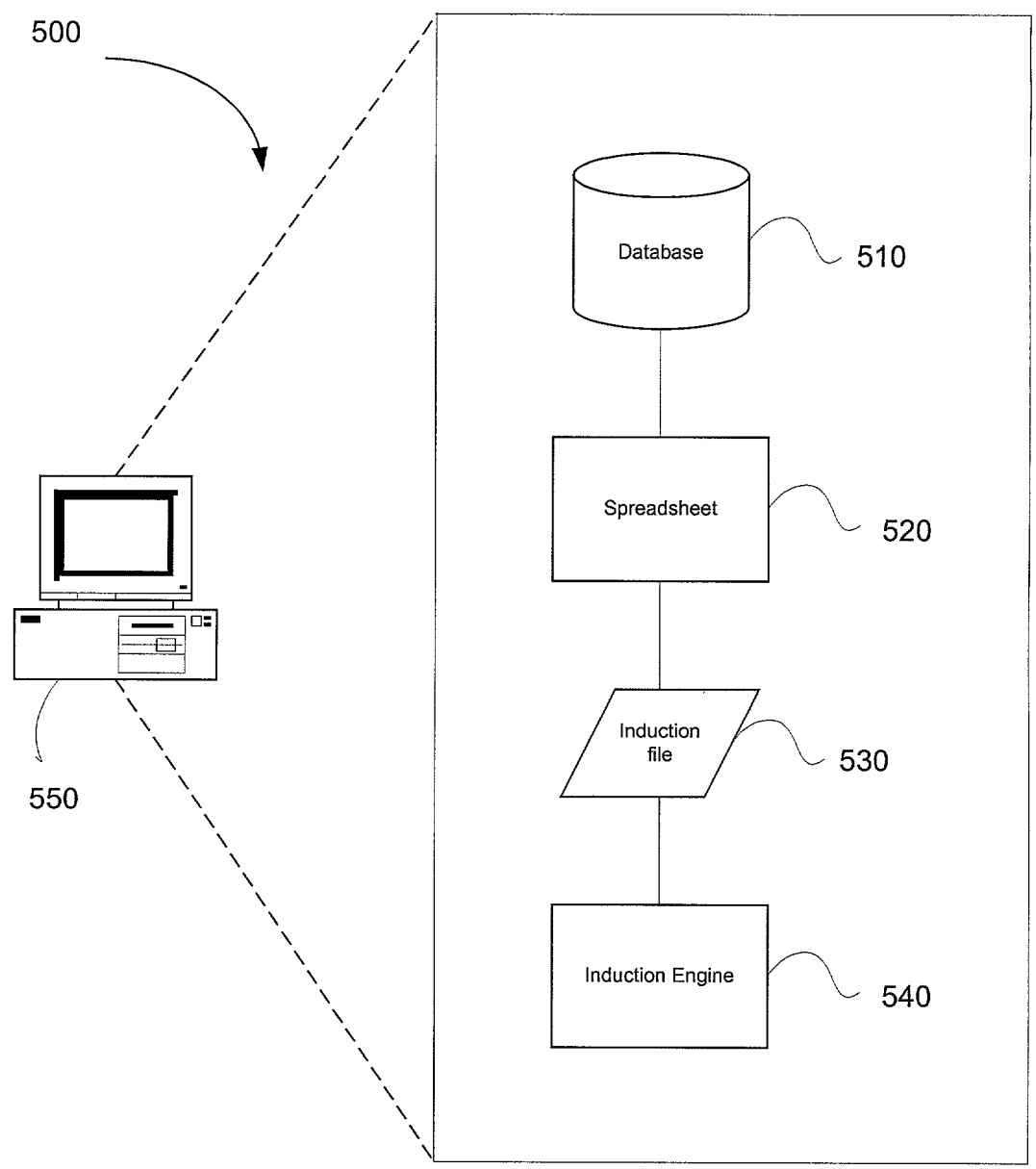
FIG. 5 shows a system according to an exemplary embodiment of the present invention.

An exemplary system 500 is shown in FIG. 5. As shown in FIG. 5, the data resides in a database file 510 and fed to a spreadsheet application such as Microsoft Excel 520. The data that feeds the induction engine 540 is taken out of, for example, the Microsoft Excel file 520 and saved as an induction file 530 which may be text file (*.txt) or taken from the database 510 as a database file. The induction engine 540 allows the user to create a specific import view. The import view makes it possible to specify: data file chosen for import, map name, field name, raw field, and record delimiter. Each field is then attached to a raw field. When this step is completed, the upload between induction file 530 and the induction engine 540 is semi-automatic. The various applications shown in FIG. 5 may reside on a single computer system 550 or be implemented by more than one computer system.

Figure 6:
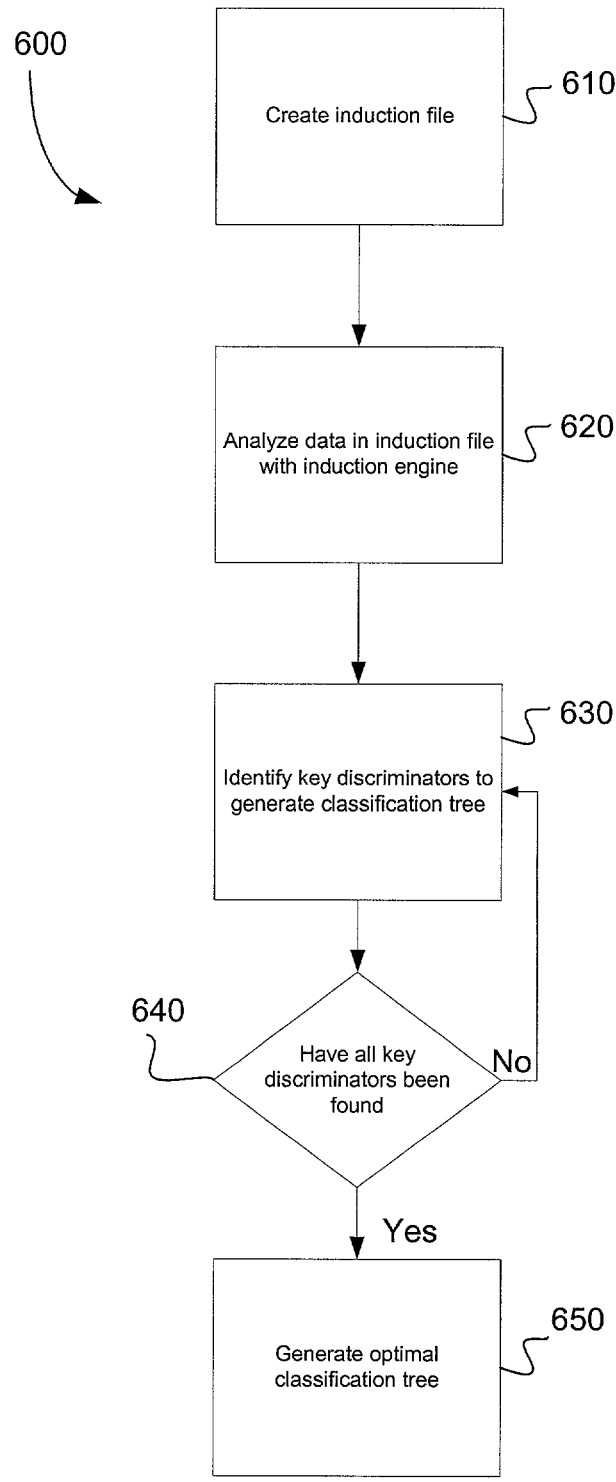
FIG. 6 is a flow chart showing a method according to an exemplary embodiment of the present invention.

A method according to a preferred embodiment is illustrated in the flow chart shown in FIG. 6. As shown, the induction file 530 is created in step 610. Next, in step 620, the data in the induction file 530 is analyzed with the induction engine 540 which preferably employs a CBR (case-based reasoning) algorithm to derive rules from the company profile data (e.g., a classification and regression tree ("CART") algorithm). CBR is an AI technique that requires the practice of knowledge discovery principles. The data is analyzed in step 630 until a key discriminator is found. The analysis continues in step 640 until all key discriminators are found. When all the key discriminators are found, an optimal classification tree is generated in step 650.

For illustrative purposes, the methodology utilized by a typical CBR algorithm is applied to the data set identified in Table 2.0, which represents 16 cases of the effects of pressure and temperature on the breaking point of steel. Pressure and temperature are each rated on a scale between 1 and 4, with one representing the lowest value and 4 representing the highest value. In Table 2.0, the plus "+" sign means that the steel will break under the given pressure and temperature values, and the negative "−" sign means that the steel will not break under the given pressure and temperature values. The CBR algorithm is applied to the data set in Table 2.0 to determine the most significant factor (pressure or temperature) on the breaking point of steel.

TABLE 2.0

| P R E S S U R E | 4 | + | + | + | + |
|---|---|---|---|---|---|
| | 3 | + | + | + | + |
| | 2 | − | − | − | + |
| | 1 | − | − | − | − |
| | | 1 | 2 | 3 | 4 |
| | | TEMPERATURE → | | | |

Figure 7:
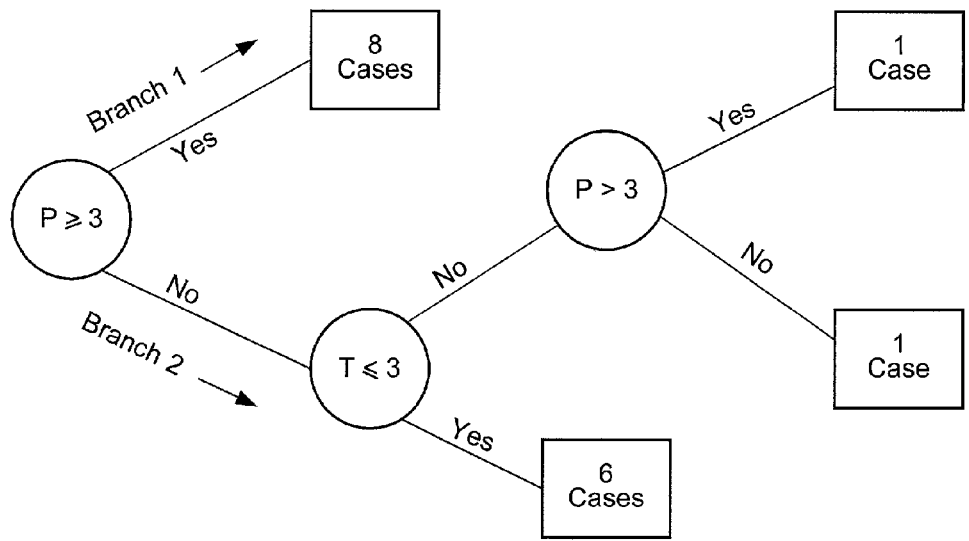
FIG. 7 is a decision tree generated using a CART algorithm for the illustrative data in Table 2.0.

The CBR algorithm loops through multiple solutions using the case data to identify a first most significant factor or an index root. Based on the data in Table 2.0, the CBR algorithm identifies pressure having a value of 3 or greater as the most significant factor affecting the breaking point of steel. Referring to the Table 2.0, for cases having a pressure value of 3 or higher, the steel will break regardless of the temperature, as indicated by the plus sign. As the CBR algorithm continues to loop through the case data, the next most significant factor is temperature having a value of 3 or less. For all cases having a temperature value of 3 or less, and a pressure of less than 3, the steel will not break as indicated by the negative signs. The third most significant factor or node, is pressure greater than 1. The results of the CBR algorithm on the data in Table 2.0 is graphically depicted in FIG. 7.

CBR includes the ability to reason in domains that are not completely understood and to evaluate solutions when no or poor algorithmic methods are available. In the present area of business performance, CBR supports human judgment by identifying clusters or patterns where predictive rules and procedures cannot be determined using rule-based systems.

Indeed, CBR is considered to come closest to how human learning and reasoning operates, given that people learn and reason mostly from past relevant cases. That is, like human reasoning, CBR includes the creation of categories and the application of rules (e.g., precise or heuristic rules). CBR also simulates a human's reliance on past experience, by defining certain events and their outcomes as cases that the CBR algorithm may search as a "past experience." These precedent cases may then be reapplied to a current case.

More specifically, CBR allows the storage of cases relating to specific problems that have been solved already. Once the past cases have been stored in a case library, it is possible to compare and match a current unsolved case with a past one for which a solution was found. In addition, as new solved cases are added to the library, a fuller understanding of problem solving emerges. This learning process allows the system to circumvent one of the shortcomings of traditional AI systems, namely the problems associated with defining and modifying the rule-base that governs decisions in a conventional rule-based system.

Thus CBR involves reasoning about a current situation based on past instances. The user can look at previous case details and associated decisions, quite unlike the rule base required in traditional AI approaches.

In the method and the system of the present invention, a CBR algorithm is employed, such as the type available under the name ReMind™ (the "ReMind Algorithm"), which uses a CART (classification and regression tree) algorithm. As is well known, a CART algorithm generates or builds classification trees as shown in FIGS. 9 and 11 through 13. In some cases, the CART algorithm may give the user the flexibility to prune nodes.

With a CART algorithm, it is necessary to start with a root (or an index root as called in the ReMind Algorithm) that has all cases in a training set. In the case of the ReMind Algorithm, it is necessary to store all cases and to ensure that all the fields to be clustered are marked "Match" and that the Outcome value is marked "Outcome".

The aim of the CART algorithm is to "loop" until there are too few remaining cases. To do that, the CART algorithm will scan through all the possible splits of nodes until an optimal split is reached. Once it has determined the optimal split, it creates nested sequences of sub-trees where it has split the data. CART also uses error techniques to refine the optimal final tree. The ReMind Algorithm gives the option of splitting cases "breadth" or "depth" first. Using the ReMind Algorithm it is also possible to influence the final tree by using qualitative weightings.

The CART algorithm can be further understood by its operation on the data set shown in FIG. 8, which includes 21 sets of responses (i.e., 21 cases) to 20 questions. FIG. 8 illustrates the results of a first hypothetical example that considers whether there is a relationship between answers to key questions on E-business strategy and the levels of appropriateness of this strategy. These 21 companies have answered the E-business questionnaire (as shown in FIG. 2) and their answers and a rounded integer of the average of the answers (the "Outcome") are shown in FIG. 8. Although the questions are directed to E-business, any of the metrics previously discussed are also applicable.

Looking at this two-dimensional representation of the population, a few facts can be deduced. It is apparent that there is some influence of some answers to some questions on the overall outcome. Using rule induction, e.g., a CBR algorithm, it is possible to identify a more formal statement, or sequence of answers to specific questions, of the relationships between answers and quartile positioning.

Analyzing the data set in FIG. 8, it can be seen that the following distribution exists for the twenty-one outcomes or targets, each outcome having a value of 1, 2, 3, 4 or 5: for outcomes having a value of 1, there are 2 occurrences; for outcomes having a value of 2 there are 5 occurrences; for outcomes having a value of 3, there are 8 occurrences; for outcomes having a value of 4 there are 4 occurrences; and for outcomes having a value of 5, there are 2 occurrences. This data is represented in column 2 of Table 3.0, below. Evaluating these results, it is understood that the top quartile (i.e. top 25%) is defined by outcomes having a value of 4 and 5, the bottom quartile is defined by outcomes having a value of 1 and 2, and that the middle quartile is defined by outcomes having a value of 3, as well as some outcomes having values of 2 and 4. The quartile calculation has been previously described.

below, is calculated for each question in combination with each possible response (e.g., 1 through 5). Typically, the higher the Improvement value of a question the more likely the question is a splitting node and hence a key discriminator. In the example shown in FIGS. 8 and 9, Field (question) 20 has the highest calculated Improvement value (when the response is less than or equal to 1; or greater than 1) and is therefore the root or index node.

In order to calculate the Improvement value, the following individual variables must first be identified or calculated: the Probability of each Possible Outcome; each True Case where the response to question 20 is less than or equal to 1; the Probability of each True Case; each False Case where the response is greater than 1; and the Probability of each False Case. For the present example, the values for these variables are represented in Table 3.0. Also calculated are the Probability of all True Cases and all False Cases. To understand the Improvement value, a sample calculation is described below for the root or index node at field or question 20.

The variables are obtained by testing the twenty-one responses to question 20 to determine if Q 20≤1. If a response to question 20 is less than or equal to 1, the outcome for that case is indicated in the True Case column, column 4 in Table 3.0, and if the response to question 20 is greater than 1, then the outcome is indicated in the False Case column, column 6 in Table 3.0. Evaluating the responses in FIG. 8, there are only

TABLE 3.0

| Possible Outcomes/ Target | Distribution of Possible Outcomes | Probability of each Possible Outcome | True Cases for (Q 20 ≤ 1) | Probability of each True Case | False Cases for (Q 20 ≤ 1) | Probability of each False Case |
|---|---|---|---|---|---|---|
| 1 | 2 | 2/21 | 2 | 2/2 | 0 | |
| 2 | 5 | 5/21 | 0 | 0 | 5 | 5/19 |
| 3 | 8 | 8/21 | 0 | 0 | 8 | 8/19 |
| 4 | 4 | 4/21 | 0 | 0 | 4 | 4/19 |
| 5 | 2 | 2/21 | 0 | 0 | 2 | 2/19 |
| Total | 21 | 21/21 | 2 | 2/2 | 19 | 19/19 |

The CART algorithm begins the process by looping through the various questions to identify splits or nodes. Each field contains one or more nodes that represent a decision branch along the cluster tree generated by the CART algorithm. Depending on the data drawn from the numerical answers given in the E-business questionnaire (i.e., a value between 1 and 5), a different outcome is possible.

Figure 9:
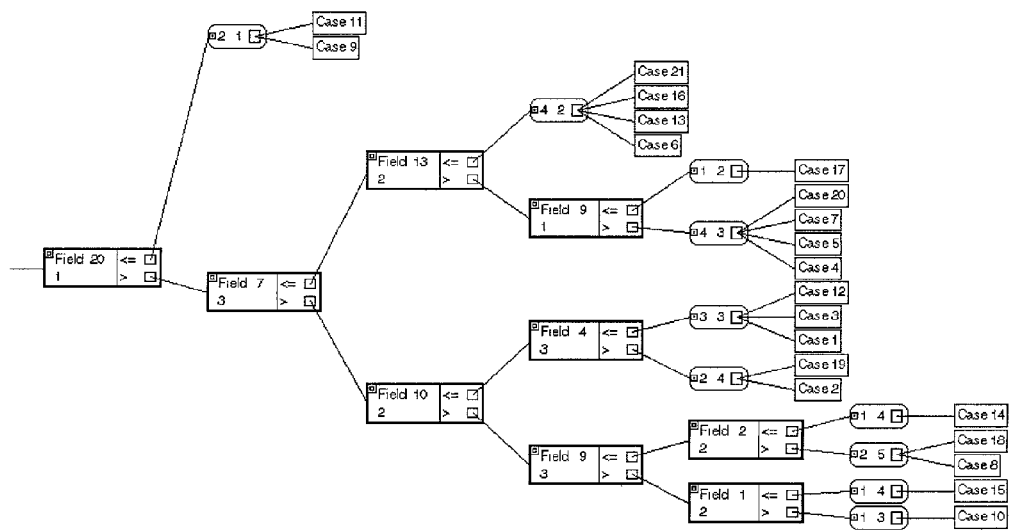
FIG. 9 is a decision tree generated using a CART algorithm based on the data in the table of FIG. 8.

The decision tree shown in FIG. 9 confirms that there are some questions and associated answers that explain a company's quartile positioning. It can also be seen that the spread of outcomes is fairly well clustered. As shown in FIG. 9, Field 20 (i.e. question 20) is the key discriminator (when answer is less than or equal to 1; or greater than 1). (Referring to FIG. 8, Field 20 represent the answer to question 20 of the E-business questionnaire.) If the answer to question 20 is less than or equal to the numerical value 1, then two company profiles (i.e., Case 9 and Case 11) are bottom quartile ones; no further nodes or splits are available. Once this key discriminator has been detected, it is possible to refine the analysis by clustering further the remaining 19 cases.

More specifically, the operation of a CART algorithm on the data in FIG. 8 can be explained as follows. In order to identify the root or index node as Field 20, the CART algorithm cycles through the data set, the 21 cases, to identify key discriminators based on a calculated Improvement value. The Improvement value, which will be described in more detail two occurrence where the response is less than or equal to 1. Each of these cases, columns 9 and 11 of FIG. 8, also have an outcome of 1 and are indicated as such in column 4. In all other cases, the responses are greater than 1, and therefore considered a false case. As indicated in Table 3.0, there are 5 occurrences where the outcome is 2 (i.e., questions 6, 13, 16, 17, 21, all five questions having a response greater than 1), there are 8 occurrences where the outcome is 3, there are 4 occurrences where the outcome is 4 and there are 2 occurrences where the outcome is 5, all totaling 19 outcomes or cases where the response to question 20 is greater than 1 (or not less than or equal to 1).

With the numbers for true and false cases identified, the probability of each case can be derived as indicated in columns 5 and 7, respectively. As further shown, the probability of each possible outcome is also calculated as indicated in column 3. Next, the probability of all true cases and all false cases are also calculated, with the probability of all true cases equal to $2/21$ and the probability of all false cases equal to $19/21$.

With the foregoing values derived, an Improvement value can be calculated, which represents the strength of a particular discriminator or question in predicting quartile ranking. The Improvement value is preferably calculated using the following formula: Improvement=$\Delta(x, s)=i(x)-p_T i(x_t)-p_F i(x_f)$, where $p_T$ is equal to the probability of all true cases ($2/21$), $p_F$ is equal to the probability of all false cases (19/21), x is equal to a node or split, s is equal to a splitting node and i is equal to the impurity. The impurity for all outcomes, i(x), is calculated as follows: $1-(p_{o1})^2-(p_{o2})^2-(p_{o3})^2(p_{o4})^2-(p_{o5})^2$, where each of $p_{o1} \ldots p_{o5}$ is equal to the probability of each of the outcomes between 1 and 5 as indicated in column 3 of Table 3.0. The impurity for true cases, $i(x_t)$, is calculated as follows: $1-(p_{t1})^2-(p_{t2})^2-(p_{t3})^2-(p_{t4})^2-(p_{t5})^2$, where each of $p_{t1} \ldots p_{t5}$ is equal to the probability of each of the true outcomes/cases as indicated in column 5 of Table 3.0. The impurity for false cases, $i(x_f)$, is calculated as follows: $1-(p_{f1})^2-(p_{f2})^2-(p_{f3})^2-(p_{f4})^2-(p_{f5})^2$ where each of $p_{f1} \ldots p_{f5}$ is equal to the probability of each of the false cases as indicated in column 7 of Table 3.0. For example, the impurity for false cases, the data taken from column 7 of Table 3.0, is calculated as follows: $1-(0)^2-(5/19)^2-(8/19)^2-(4/19)^2-(2/19)^2=0.6980609$. Table 4.0 identifies the calculated values for each of the above-indicated impurities.

TABLE 4.0

| Impurity | i(x) | $i(x_t)$ | $i(x_f)$ |
|---|---|---|---|
| Value | 0.7437642 | 0 | 0.6980609 |

In the present example, the Improvement value is then equal to $i(x)-p_T i(x_t)-p_F i(x_f)$, which is equal to $0.7437642-(2/21)\times 0-(19/21)\times 0.6980609=0.1121853$. Although the calculations have not been indicated herein, the CART algorithm loops through the data set to calculate an improvement value for every question for every possible outcome. That is, the CART algorithm will test Q1-Q20 at values of 1, 2, 3, 4 and 5 to identify the question with the highest improvement as the root or index node. In the present example, question 20 having a value greater than 1 provides the highest Improvement value.

The remaining 19 company profiles with an answer to question 20 that is greater than the numerical value 1 need to be divided further. The next discriminator for these 19 company profiles is question 7, as shown in FIG. 9. At this point, there is another trend towards the bottom quartile: if the answer to question 7 is less than or equal to the numeral value 3 AND the answer to question 3 is less than or equal to the numerical value 2.

Going back to the node of question 7, if the answer to question 7 is greater than the numerical value 3 and question 10 is greater than the numerical value 2, then there is a very high propensity for top quartile positioning. This propensity is measurable.

In order to identify these subsequent nodes or key discriminators, the CART algorithm continues to process the cases after the root or index node is identified. In the present example, the next node identified is question 7. As shown in FIG. 9, question or field 7, unlike the index node, includes a top branch at values of less than or equal to 3 and a lower branch at values of greater than 3. In addition, the data set is reduced to those cases that are responsive to the previous node, so that only 19 cases are considered in the subsequent analysis. Table 5.0 includes the variable values for calculating the Importance value for question 7.

TABLE 5.0

| Possible Outcomes/ Targets | Distribution of Possible Outcomes | Probability of each Possible Outcome | True Cases for (Q 7 ≤ 3) | Probability of each True Case | False Cases for (Q 7 ≤ 3) | Probability of each False Case |
|---|---|---|---|---|---|---|
| 1 | 0 | 0 | 0 | 0 | 0 | 0 |
| 2 | 5 | 5/19 | 5 | 5/9 | 0 | 0 |
| 3 | 8 | 8/19 | 4 | 4/9 | 4 | 4/10 |
| 4 | 4 | 4/19 | 0 | 0 | 4 | 4/10 |
| 5 | 2 | 2/19 | 0 | 0 | 2 | 2/10 |
| Total | 19 | 19/19 | 9 | 9/9 | 10 | 10/10 |

TABLE 6.0

| Impurity | i(x) | $i(x_t)$ | $i(x_f)$ |
|---|---|---|---|
| Value | 0.6980609 | 0.4938272 | 0.640 |

As with the previous calculation, the Improvement value is then equal to $i(x)-p_T i(X_t)-p_F i(X_f)$ or $0.6980609-(9/19)\times 0.4938272-(10/19)\times 0.640=0.1273006$. However, since the data set is reduced to 19 out of 21 total cases, the Improvement value must also be reduced by a data set reduction factor of 19/21 so that the Improvement value is equal to 0.1151768. Although the calculations have not been indicated herein, the CART algorithm continues to loop through the data set to calculate an Improvement value until an optimal tree with the optimal number of nodes or splits is created.

The full decision tree in FIG. 9 shows that 19 out of 21 company profiles are easily clustered and can be identified after less than 10 splits. These consist of the key discriminators: Questions 20, 7, 13, 9, 4, 10, 2, and 1. This decision tree points to the potential of clustering when the number of cases and the parameters considered are expanding, or that other clusters are needed by turnover, industry sector, geographic area.

Referring now to FIGS. 3 and 10 through 13, a second hypothetical example of the application of a CART algorithm is shown. This example considers whether there is a relationship between the levels of appropriateness of risk management and controls in relation to occurrence of fraud in companies. The example consists of 25 hypothetical companies with turnovers ranging from £100m to more than £5bn, their respective profiles of risk management and control practices and whether there has been an occurrence of fraud ("0" or "1", "0" meaning "no occurrence of fraud" and "1" being "occurrence of fraud"). For this example, 20 questions on Risk Management & Controls were used as shown in FIG. 3. The 20 questions were answered on a scale from 1 to 5. The results are shown in FIG. 10.

Figure 11:
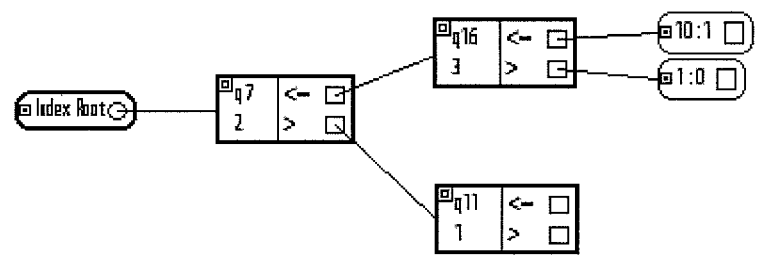
FIG. 11 is a partial decision tree generated using a CART algorithm to identify the key discriminator for the data shown in FIG. 10 according to an exemplary embodiment of the present invention.
Figure 12:
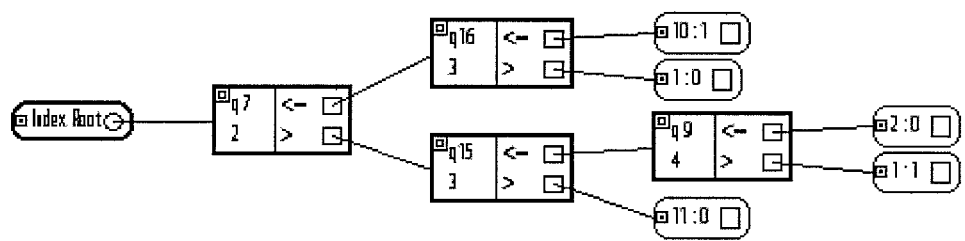
FIG. 12 is a partial decision tree generated using a CART algorithm to identify a next discriminator for the data shown in FIG. 10 according to an exemplary embodiment of the present invention.

Looking at a two-dimensional representation of the hypothetical population, a few facts can be deduced. It is apparent that there are some "linkages" between lower levels of answers and the outcome (i.e. whether there is fraud or not). Using induction it is possible to identify a more formal statement of these "linkages." The partial inductive-based decision tree (FIG. 11) shows that Question 7 ("There is an appropriate level of strength of the internal audit activity") is the key discriminator. Once this key discriminator has been detected, it is possible to refine the analysis by clustering further the 25 company profiles. The eleven profiles with an answer for Question 7 of less or equal to 2 need to be divided into the ten instances with fraud occurrence versus the one instance without fraud. As shown in FIGS. 11 and 12, the next discriminator for these eleven companies is answer to Question 16 ("New and changing risks are clearly identified and reported to senior management.").

The 13 cases (12 with no fraud, one with fraud) also need to be subdivided further. When they are classified into companies with a high level of appropriateness of "policies and working practices to reduce risks by enhancing the quality of the organization staff" (Question 15), it identifies 10 cases without fraud as shown in FIG. 12.

Figure 13:
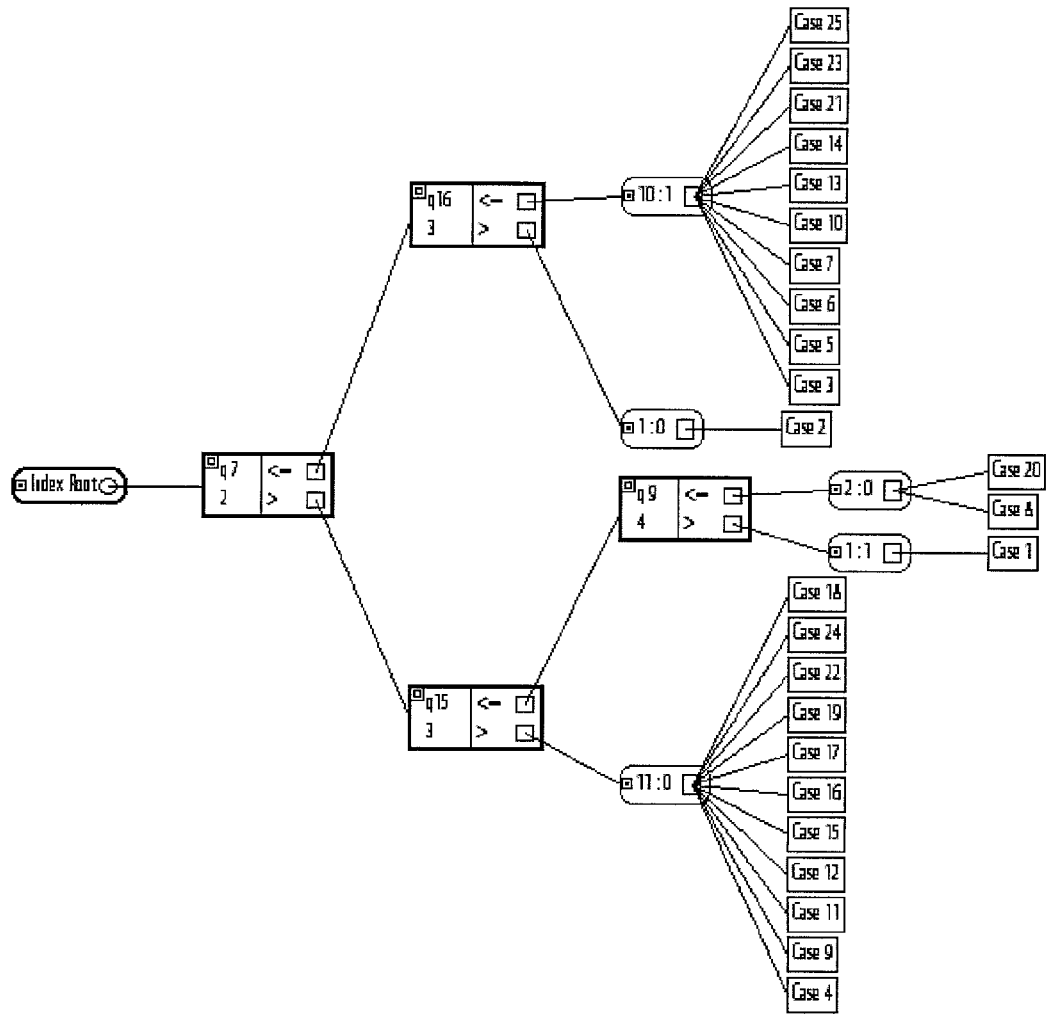
FIG. 13 is a full decision tree generated using a CART algorithm for the data shown in FIG. 10 according to an exemplary embodiment of the present invention.

The full decision tree in FIG. 13 shows that 22 out of 25 cases are easily clustered and can be identified after two splits. These consist of 11 non fraud (for which the result is '0') and 10 with fraud (for which the result is '1'). The remaining 3 cases are clustered into fraud and non after three splits, the last one being question 9.

This decision tree points to the potential of clustering when the number of company profiles and the parameters (i.e. questions) considered are expanded. The addition of extra questions and company profiles is likely to produce leaner branches (giving a more detailed justification of the conclusion) as well as more cases at each node (giving more consistency to the explanation).

It should be noted that the addition of extra questions and company profiles may produce "leaner" branches (giving a more detailed justification of the conclusion) as well as more cases at each node (giving more consistency to the explanation). This way clustering helps the user to access a resolution to problem-solving, without necessarily having access to or understanding the specific financial or quantitative data distinguishing one company profile from another.

It may also be possible to test the validity and predictability of the induction results (i.e., the clustering) by re-building the tree without a set or sets of business cases. For example, a random set of 10% of the cases for this illustration (e.g., 2 cases) can be unstored and re-run through the tree (re-built without these unstored cases) to evaluate if the cases are positioned in the same quartile as they should be. On the basis of this evaluation process it is possible to expand/reduce/amend the number and nature of business cases which have been collected. Any business case having a significant impact on the clustering results will be stored. If a business case does not have any impact on the clustering results, it might be rejected, except if a decision is made to keep the case because of the significance of, for example, the name recognition of the company associated with the business case. In this way the system and method of the present invention constantly learns new key drivers that point toward specific levels of performance.

Accordingly, a benefit in using CBR in evaluating company profiles including business performance data is that it helps provide a better understanding of patterns of business performance. In this way, the present invention could be used by companies to support their pricing decision based on the analyses of past business profiles. This approach would allow a more detailed and meaningful analysis and becomes more likely with the increased interest in data warehouses in many organizations. Additionally shared case libraries (preferably by a number of companies in the same industry) may be used to incorporate global knowledge, which is crucial in the area of understanding business performance.

4. Reports

Data can be provided to a client in many formats and through various communication channels. As explained, data are derived from the answers to the questionnaires as provided by clients, targets auditors, or consultants.

The database structure employed permits various data presentation formats. By using a database, data may be easily extracted and moved into presentation templates that include pointers to relevant database fields in the database where the data is resident. For example, reports may be generated that show a comparison between a participating company's e-business performance and the performance of other companies in the database. Alternatively, or in addition, a narrow set of comparison results may be provided such as: Relative positioning; Areas with favorable performance gaps; Most favorable gaps; and Most unfavorable gap (e.g., lack of effective plans in place).

In addition, from the cluster tree shown in FIGS. 9 and 13, slides on performance ranking as shown in FIG. 4B can be developed. The information from cluster trees may also be used to design the slides that show the tests for performance positioning as shown in the FIGS. 4C through 4E.

5. Best Practices

Best practices come from many different resources. They are also validated by experts knowledgeable about a given industry or service. The best practice information is shared with the companies to help improve their business performance. FIGS. 14A and 14B show representative best practices for each of the 20 questions in the E-business questionnaire.

Thus, the present benchmarking tool, technique, system and method represent more than a mere collection and comparison of an organization's performance measures with those of competitors or world's best practices. Rather, the benchmarking system and method according to an exemplary embodiment of the present invention also shows (i) strengths and weaknesses of the business processes of an organization, (ii) how the organization compares with other entities (i.e. competitors and world leaders), (iii) what, if anything, is transferable to the organization's particular circumstances, and (iv) how to make that transfer.

In addition, the induction process provides a framework for exploring the domain and concrete examples (business profiles of performance) to support a decision. Also, the user is exposed to questions (or variables) which may have been overlooked, forgotten or incorrectly specified.

It will thus be seen that the objects set forth above, among those made apparent from the preceding description, are efficiently attained and, since certain changes may be made in carrying out the above method and in the system set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A computerized method of business performance benchmarking to inductively identify key factors that drive towards a specific outcome value, comprising:

obtaining business performance information for a plurality of business entities from one or more representatives of, or consultants to, each business entity, the business performance information including (i) a first set of performance criteria covering various different business performance areas, each performance criterion of the first set of performance criteria having an associated value for scoring the performance of the plurality of the business entities, and (ii) an outcome value representing a rank or state of the business entity; and using a data processor, applying a classification and regression tree algorithm to jointly evaluate the first set of performance criteria and associated values for each of the plurality of business entities, and using said outcome value, automatically identify an optimal subset of performance criteria that most contribute to the outcome value for said plurality of business entities, wherein said associated value to each performance criterion is a number chosen from a range of at least four possible numbers corresponding to how well a company implements or accomplishes the given business performance criterion.

2. The method of claim 1, wherein said obtaining the first set of business criteria and the associated values is done via a questionnaire containing a plurality of questions that probe into said various business performance areas.

3. The method of claim 1, wherein the outcome value is based on an average score of all the associated values for that entity.

4. The method of claim 3 wherein said outcome value is a quartile ranking such that the highest 25 percent of business entities in said plurality are ranked in the top quartile, the middle 50 percent are ranked in the inter-quartile and the lowest 25 percent are ranked in the bottom quartile.

5. The method of claim 1 further comprising the step of representing the optimal subset of performance criteria that most contribute to the outcome value as a classification tree wherein a first performance criterion of the subset of performance criteria is identified as a root node and all other performance criterion from the subset of performance criteria are identified as sub-nodes.

6. The method of claim 1 wherein the associated values comprise numerical values based on a scale between 1 and 5.

7. The method of claim 1 wherein the first set of performance criteria and the associated numerical values for scoring the performance of the plurality of entities are stored in a database as separate company profiles to define a knowledge-base from which a rule induction engine identifies the key discriminators of business performance.

8. The method of claim 1 wherein the associated values comprise numerical values based on a scale between 1 and 5.

9. A nontransitory computer readable medium, comprising a set of instructions that when executed, cause a computer or data processor to:

obtain business performance information for a plurality of business entities from one or more representatives of, or consultants to, each business entity, the business performance information including (i) a first set of performance criteria covering various different business performance areas, each performance criterion of the first set of performance criteria having an associated value for scoring the performance of the plurality of the business entities, and (ii) an outcome value representing a rank or state of the business entity; and apply a classification and regression tree algorithm to jointly evaluate the first set of performance criteria and associated values for each of the plurality of business entities, and using said outcome value, automatically identify an optimal subset of performance criteria that most contribute to the outcome value for said plurality of business entities, wherein said associated value to each performance criterion is a number chosen from a range of at least four possible numbers corresponding to how well a company implements or accomplishes the given business performance criterion.

10. The nontransitory computer readable medium of claim 9, further comprising a spreadsheet application and a presentation application for generating reports based on the business information data.

11. The nontransitory computer readable medium of claim 10 wherein the spreadsheet application supplies the business performance information to the rule induction engine.

12. The nontransitory computer readable medium of claim 9, wherein said instructions further cause said computer to obtain the first set of business criteria and the associated values via a questionnaire containing a plurality of questions that probe into specific performance areas of the business entities.

13. The nontransitory computer readable medium of claim 9, wherein said outcome value is based on an average score of all the associated numerical values for that entity.

14. The nontransitory computer readable medium of claim 9, wherein said outcome value is a quartile ranking such that the highest 25 percent of business entities in said plurality are ranked in the top quartile, the middle 50 percent are ranked in the inter-quartile and the lowest 25 percent are ranked in the bottom quartile.

15. The nontransitory computer readable medium of claim 9, wherein said instructions further cause said computer to represent the optimal subset of performance criteria that most contribute to the outcome value as a classification tree wherein a first performance criterion of the subset of performance criteria is identified as a root node and all other performance criterion from the subset of performance criteria are identified as sub-nodes.

16. The nontransitory computer readable medium of claim 9, wherein the first set of performance criteria and the associated numerical values for scoring the performance of the plurality of entities are stored in a database as separate company profiles to define a knowledge-base from which a rule induction engine identifies the key discriminators of business performance.

* * * * *